United States Patent [19]

Leverett

[11] Patent Number: 5,024,047
[45] Date of Patent: Jun. 18, 1991

[54] WEIGHING AND SORTING MACHINE AND METHOD

[75] Inventor: William H. Leverett, Greenville, Ga.

[73] Assignee: Durand-Wayland, Inc., Lagrange, Ga.

[21] Appl. No.: 491,247

[22] Filed: Mar. 8, 1990

[51] Int. Cl.⁵ .............................................. B65B 5/10
[52] U.S. Cl. ...................................... 53/502; 209/912
[58] Field of Search ................. 53/502, 154; 209/592, 209/593, 912; 198/443, 954; 177/52

[56] References Cited

U.S. PATENT DOCUMENTS

| | | | |
|---|---|---|---|
| 3,073,399 | 1/1963 | Durand . | |
| 3,640,384 | 2/1972 | Del Rosso | 209/593 X |
| 3,894,625 | 7/1975 | Boyle | 198/137 |
| 4,262,807 | 4/1981 | Leverett | 209/592 |
| 4,428,179 | 1/1989 | Jordan | 53/502 |
| 4,550,073 | 5/1984 | Burnett | 209/912 X |
| 4,586,613 | 5/1986 | Horii | 209/912 X |
| 4,957,619 | 9/1990 | Powell . | |

*Primary Examiner*—John Sipos
*Attorney, Agent, or Firm*—Jones, Askew & Lunsford

[57] ABSTRACT

A weighing and sorting apparatus which reduces the handling of articles during processing to group a plurality of such articles in a container such that the combined weight of the group is no less than a predetermined value, and which minimizes the excess weight in the container over the predetermined value. A continuous conveyor carries a plurality of cups in a horizontal plane. Each empty cup receives an article at a loading zone from a plurality of articles having varying weights. The cups pass in sequence through a weighing zone where the weight for the article in each cup is determined and registered with a controller. The cups then pass through a discharge zone where the controller selects articles to be discharged into a container with other selected articles. After the accumulated weight of articles in the container reaches a predetermined value less than the label weight of the container, the controller scans the weighed articles on the conveyor for the article or articles having an optimum weight to discharge into the container to bring the total weight to no less than the label weight. An article not selected remains on the conveyor. The apparatus and process thereby reduces the handling of such articles because an article, once loaded, remains on the conveyor and passes repeatedly through the weighing zone and the discharge zone until the article is selected and discharged into a container with other selected articles.

12 Claims, 8 Drawing Sheets

WEIGHING AND SORTING MACHINE AND METHOD

TECHNICAL FIELD

The present invention relates generally to an apparatus for sorting articles. More particularly, the present invention relates to a process and apparatus which weighs and selects articles having varying weights for collecting into groups of articles having a combined weight no less than a predetermined total weight, and which minimizes the excess weight of the group over the predetermined weight.

BACKGROUND OF THE INVENTION

Many fruits and vegetables are sold in bags with a preprinted weight. This label weight is the minimum weight of the articles. The actual weight of the articles in the bag typically exceeds the label weight to allow for shrinkage during storage and shipping of the articles. Apparatus and processes for weighing and sorting fruit or vegetable articles for grouping in bags have been described before. Such apparatus typically has a continuous conveyor carrying a plurality of pivotable cups in a loop. Each cup receives an individual article from a supply of articles. The cups pass in sequence over a weighing device to determine the weight of the article in each cup. As each article is discharged from its carrying cup into a container at a discharge zone, the weight of the articles in the container is accumulated by a controller. When the weight exceeds a predetermined value, such as the label weight for the container plus a percentage for shrinkage, the container is closed and removed from the apparatus. A new container is positioned in the discharge zone of the apparatus and filled with articles as described.

Typically, the bags of fruit or vegetables filled in this manner are sold at a price based on the label weight. The excess weight included in each container permits shrinkage and drying of the articles during storage and shipment of the containers without the total actual weight of the articles becoming less than the label weight. However, when filling bags with discrete articles, such as fruit which have nonuniform weights, simply adding the next available article to a slightly-underweight bag can yield an excess weight well over the amount required to meet the label weight of the bagged articles. This excess weight is an overage and can represent a significant cost to the packer. For instance, some such weighing and sorting apparatus fill in excess of fifty bags per minute. An overage of half a pound per container leads to an overage of twenty-five pounds per minute. For example, for bags holding five pounds label weight, the overage results in five or more "lost" bags per minute, which represents a significant loss to the packer of the articles.

U.S. Pat. No. 4,262,807 describes an apparatus and a process for weighing and sorting articles in which the selection of the last article to discharge into the container is made so as to minimize the weight overage in the container. That prior apparatus and method included parallel conveyors each of which travels in a continuous path in a vertical plane to provide an upper flight and a lower flight. A plurality of article-receiving cups is pivotably carried on the conveyor. Extending laterally from each side is a pin. The cups hang vertically during the return lower flight and are supported horizontally by the pins during travel of the cup along the upper flight. Each horizontally-disposed cup on the upper flight is loaded with an article at a loading zone, and the cups then pass in sequence through an article weighing zone containing a scale to determine the weight of the article in each cup. The conveyor then carries the cups through successive longitudinally spaced discharge zones. The discharge zones each include a support to hold a container, a device to close the container, and a discharge mechanism to direct a selected article into the container. The discharge mechanism normally allows the cups to by-pass the discharge zone. Activating the discharge mechanism at a selected discharge zone causes the cup to pivot downwardly by gravity and drop its article into the selected discharge zone.

A controller selectively actuates the discharge mechanism to discharge the selected article into a designated discharge zone, according to prescribed and different weight ranges for each discharge zone programmed into the controller. Typically, the articles will be sorted so that articles of approximately the same weight are released in the same discharge zone. As articles are selected and discharged, the controller totals the weight of articles in the container for each discharge zone. The controller scans the next series of articles to select the optimum weight article which will just top off the receptacles receiving the articles from that zone. If a weighed article is not dropped into one of the discharge zones, the article is discharged from the forward or discharge end of the sorting machine and subsequently returned by another conveyor to the loading zone for reloading a second time into another cup for reweighing and recycling.

Handling by machinery and jostling or contact of an article by other articles is an expected aspect of weighing and sorting of articles by high speed machinery, despite the bruises, blemishes or other damage the articles may receive. These kinds of damage decrease the quality of the articles and thereby decrease the value of the articles. Damaged articles may experience increased spoilage and may spoil other articles grouped in the container. Therefore, an article not discharged into a container, but rather redirected back to the loading zone, receives additional handling and bumping by machinery and by other articles not experienced by articles discharged into a container during a first selection cycle.

Thus, there exists a need in the art for a weighing and sorting apparatus and process that reduces the handling of an article loaded into a cup on a continuous conveyor for weighing, sorting and discharging into a container with a group of other articles.

SUMMARY OF THE PRESENT INVENTION

The present invention reduces the handling of articles during mechanical processing which groups a plurality of such articles in a container such that the combined weight of the group is no less than a predetermined value and the weight overage is minimized. The present invention reduces handling of articles by loading an article onto a continuous conveyor only once. The conveyor retains each article loaded in a cup and recirculates the article repeatedly through a weighing zone and a discharge zone as necessary until the article is selected and discharged into a container for grouping with other selected articles.

More particularly described, the sorting apparatus and process of the present invention provides a continuous conveyor which carries a plurality of cups in a horizontal plane. Each empty cup receives an article at a loading zone from a plurality of articles having varying weights. The cups pass in sequence through a weighing zone where the weight for the article in each cup is determined and registered with a controller. The cups then pass through a discharge zone where the controller selects articles to be discharged into a container with other selected articles. After the accumulated weight of articles in the container reaches a predetermined value, the controller scans the weighed articles for the optimum article or articles to bring the total weight in the container to no less than the label weight plus an allowable percentage for shrinkage, and discharges that selected article into the container. Articles not selected remain on the conveyor and pass again through the weighing and discharge zones. A container having a group of articles with a combined weight no less than the label weight plus a percentage for shrinkage is closed and removed from the sorting apparatus, and a new container is positioned for loading with articles.

The present invention thereby reduces the handling of such articles because once an article is loaded into a cup on the continuous conveyor, the article remains in the cup and passes repeatedly through the weighing zone and the discharge zone until the article is selected by the controller and discharged into a container with other selected articles.

Accordingly, it is an object of the present invention to provide an improved apparatus and method for weighing and sorting articles.

It is another object of the present invention to provide an article weighing and sorting apparatus and method which reduces the handling of each article necessary to group several articles in a container.

It is another object of the present invention to provide an apparatus and method for sorting and weighing articles, which will receive an article into a cup on a continuous conveyor and retain the article on the conveyor until the article is selected for discharging into a container with other selected articles.

It is another object of the present invention to provide an apparatus and method for sorting and weighing articles which will accurately and rapidly weigh each article in succession.

It is another object of the present invention to provide a process and apparatus for weighing and sorting articles for grouping of such articles into containers such that the sum of the weight of the group of articles in the container is greater than a predetermined weight while reducing to a minimum the additional weight over that predetermined weight.

It is yet another object of the present invention to provide an apparatus and process which totals the weight of articles discharged into a container and selects an appropriate article or articles carried by cups on a continuous conveyor to bring the total weight of the articles in the container within an appropriate tolerance of a predetermined total weight.

Other objects, features and advantages of the present invention will become apparent upon reading the following detailed description of the disclosed embodiment of the present invention, in conjunction with the appended drawings and claims.

DETAILED DESCRIPTION OF THE PREFERRED EMBODIMENT

Figure 1:
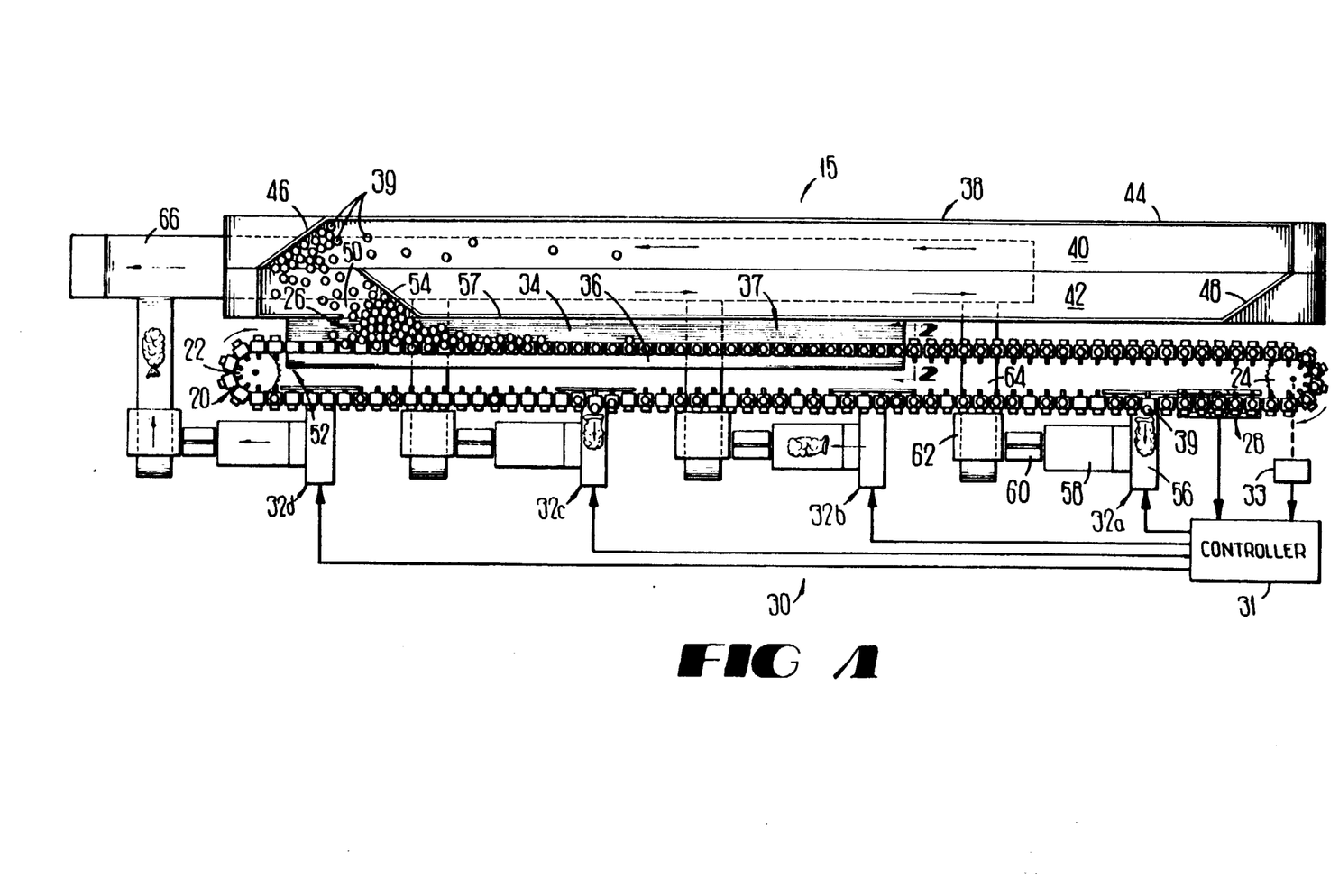
FIG. 1 is a top view of the weighing and sorting machine constructed in accordance with a preferred embodiment of the present invention.

Referring now in more detail to the drawings, in which the same parts have like identifiers, FIG. 1 is a top view of a weighing and sorting apparatus constructed in accordance with the present invention to reduce handling of articles by loading an article on the conveyor only once and retaining the article until it is selected and discharged into a container. The weighing and sorting apparatus 15 has a continuous conveyor 20, somewhat schematically shown in FIG. 2, which travels in a horizontal plane around two spaced-apart sprockets 22 and 24. The sprocket 22 is connected to a drive motor (not illustrated) in a conventional manner. Included in the weighing and sorting apparatus 15 is an elongated loading zone 26, a weighing zone 28 and a discharge zone 30. At least one container-fill station is positioned in the discharge zone 30. The illustrated embodiment has four container-fill stations 31a, 32b, 32c and 32d in the discharge zone 30. A controller 31 receives weight signals from the weighing apparatus at the weigh zone 28 and from the speed sensor 33 responsive to the speed of the sprocket 24, and selectively provides control signals to the fill stations. The function of the controller 31 in the preferred embodiment is provided by a programmable computer.

Figure 2:
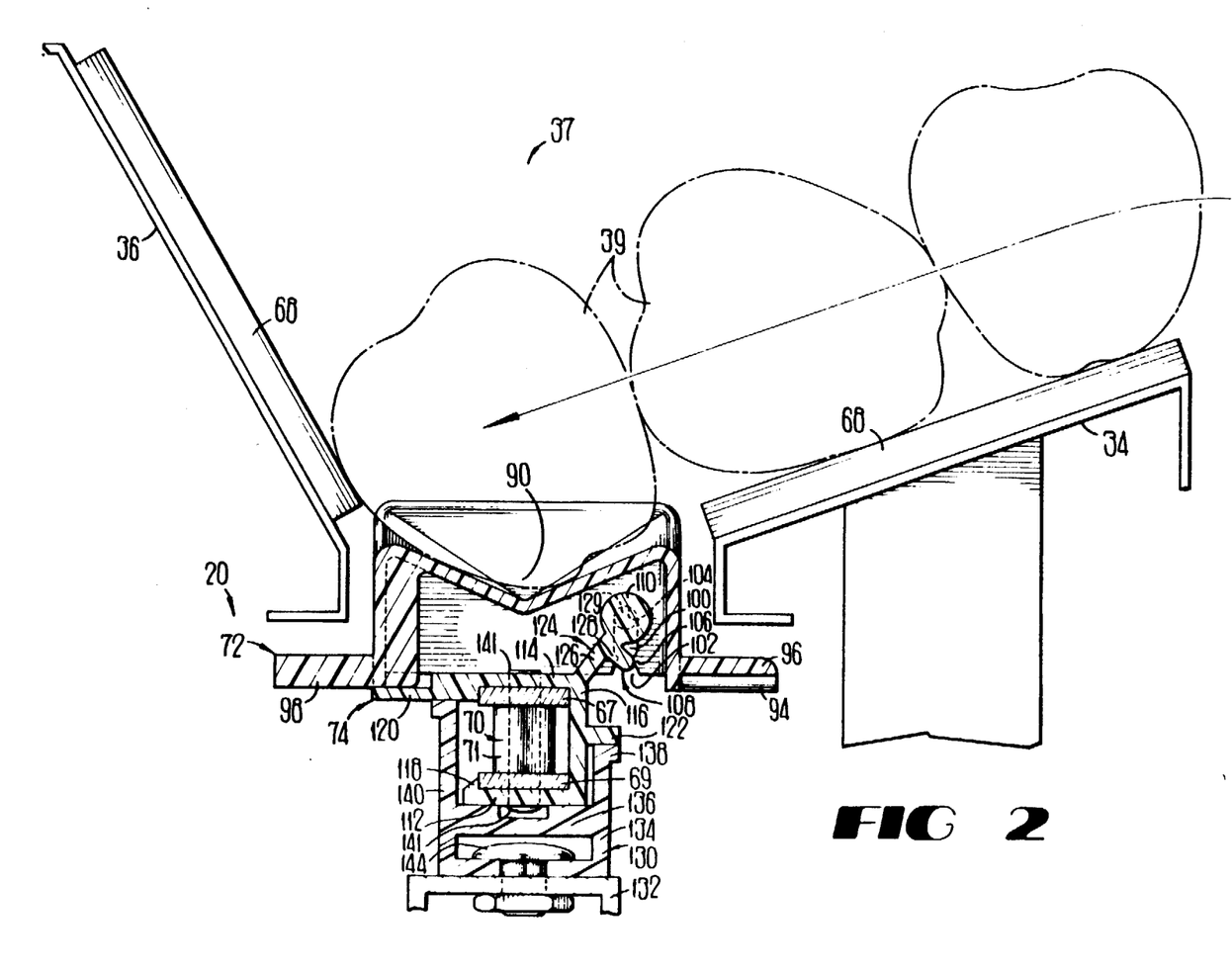
FIG. 2 is a cross-section view taken along line 2—2 of FIG. 1 at the loading zone of the present apparatus, showing the conveyor and one article-carrying cup.

The loading zone 26 includes two elongate padded panels 34 and 36. One panel is positioned on each side of the conveyor 20. As best shown in FIG. 2, the panels 34 and 36 are angled to define an open L-shaped trough generally designated 37 which parallels the conveyor 20. The weighing and sorting apparatus 15 also includes a supply bin 38 which holds a group of articles 39 to be weighed and sorted into containers. The bin 38 in the illustrated embodiment includes two parallel conveyors 40 and 42 each of which has an upper flight and a lower flight. The conveyors 40 and 42 are positioned side-by-side and, as is known in the art, travel in opposite directions as indicated by the arrows to circulate articles on the upper flights of the conveyors and move the articles into the loading zone 26.

A wall 44 encloses the supply bin 38. The wall 44 includes a pair of end walls 46 and 48 at the ends of the travel for the conveyors 40 and 42, respectively. The end walls 46 and 48 are angled transversely across the supply bin 38. The wall 44 has an opening 50 near the upstream end 52 of the loading zone 26. A guide arm 54 connects to the downstream edge 56 of the inside wall 57 at the opening 50. The guide arm 54 extends at an angle across the conveyor 42.

As illustrated in FIG. 1, the weighing zone 28 is spaced apart from the loading zone 26 on the return flight of the conveyor 20. The weighing zone 28 includes an optical encoder (not illustrated) coupled with the return sprocket 24 and a scale. The optical encoder and the scale are discussed below.

The illustrated weighing and sorting apparatus 15 includes four container-fill stations 32a, 32b, 32c and 32d in the discharge zone 30 downstream of the weighing zone 28. The container-fill stations 32 include equipment known in the art to hold, fill, and transfer a container of articles. Schematically shown in FIG. 1 at the container-fill station 32a is a bagger 56 which holds a supply of containers and receives articles 39 from the conveyor 20 into one of the containers in sequence. A slide 58 extends between the bagger 56 and a closer 60 which closes the container. A second slide 62 leads to a station transfer conveyor 64. The station transfer conveyor 64 empties onto a main transfer conveyor 66 shown in phantom below the conveyors 42 and 44 in the supply bin 38.

Turning now to FIG. 2, there is shown a cross sectional view of the weighing and sorting apparatus 15 at the loading zone 26. The loading zone 26 includes the open L-shape trough 37 defined by the elongate panels 34 and 36. The panel 34 is disposed between the supply bin 38 and the conveyor 20. The panel 34 is oriented at an inclined angle so that articles 39 may roll or slide onto the conveyor 20 from the opening 50 in the supply bin 38. The panel 36 is oriented at an angle on the opposite side of the conveyor 20 to prevent the articles 39 from moving past the conveyor 20. The panels 34 and 36 connect (not illustrated) to a frame member of the apparatus 15. A pad 68 attaches to each of the elongate panels 34 and 36 to cushion the movement of the articles 39 on the panels 34 and 36.

The conveyor 20 includes a link chain 70 (best illustrated in FIGS. 3, 4A, and 4B) oriented vertically around the drive sprocket 22 and the return sprocket 24. The link chain 70 is assembled from a plurality of upper plates 67 and lower plates 69 joined by pivot rollers 71.

Figure 3:
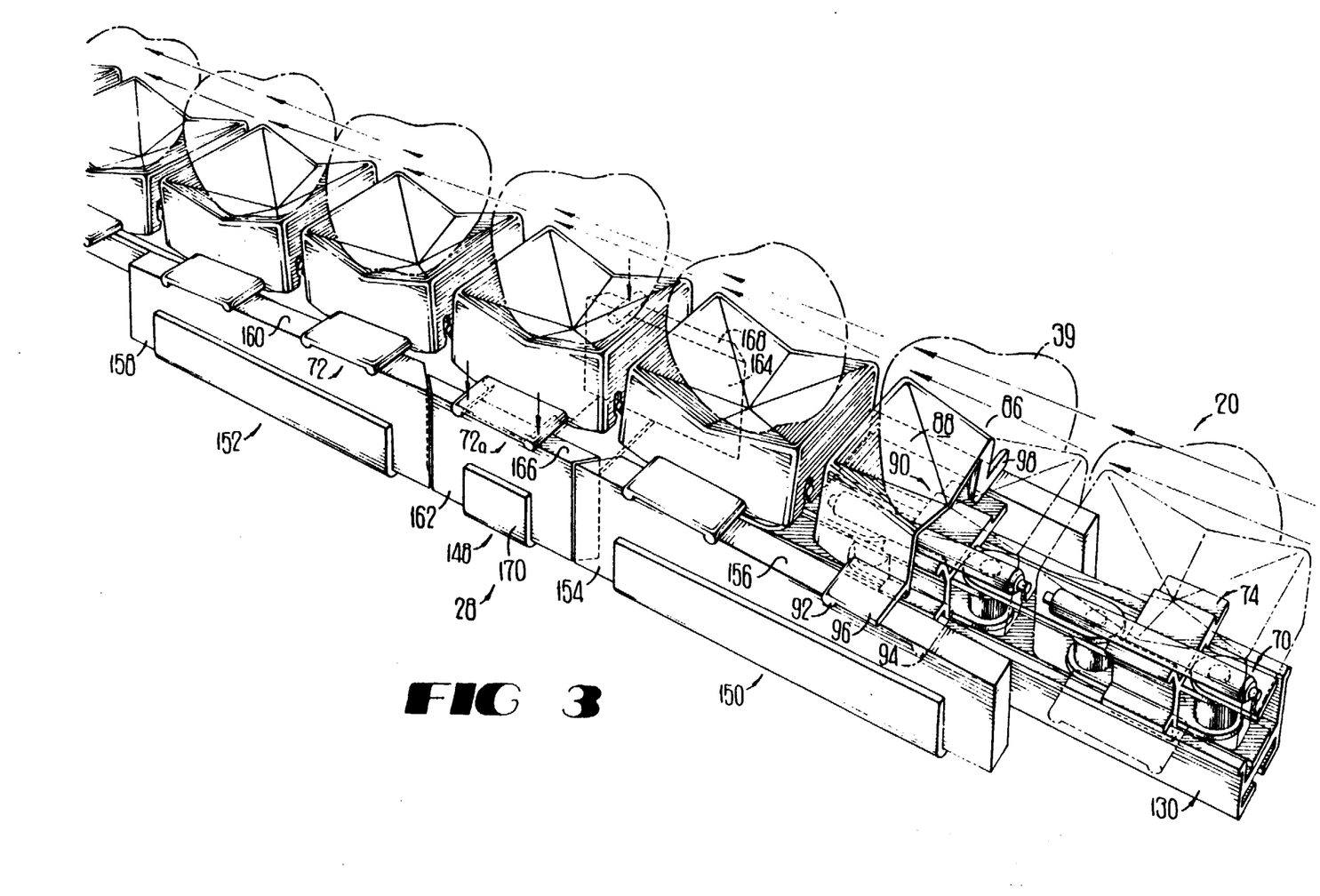
FIG. 3 is a detailed cutaway view of the article-carrying cups attached to the continuous conveyor and of the weighing zone for the apparatus illustrated in FIG. 1.
Figure 4A:
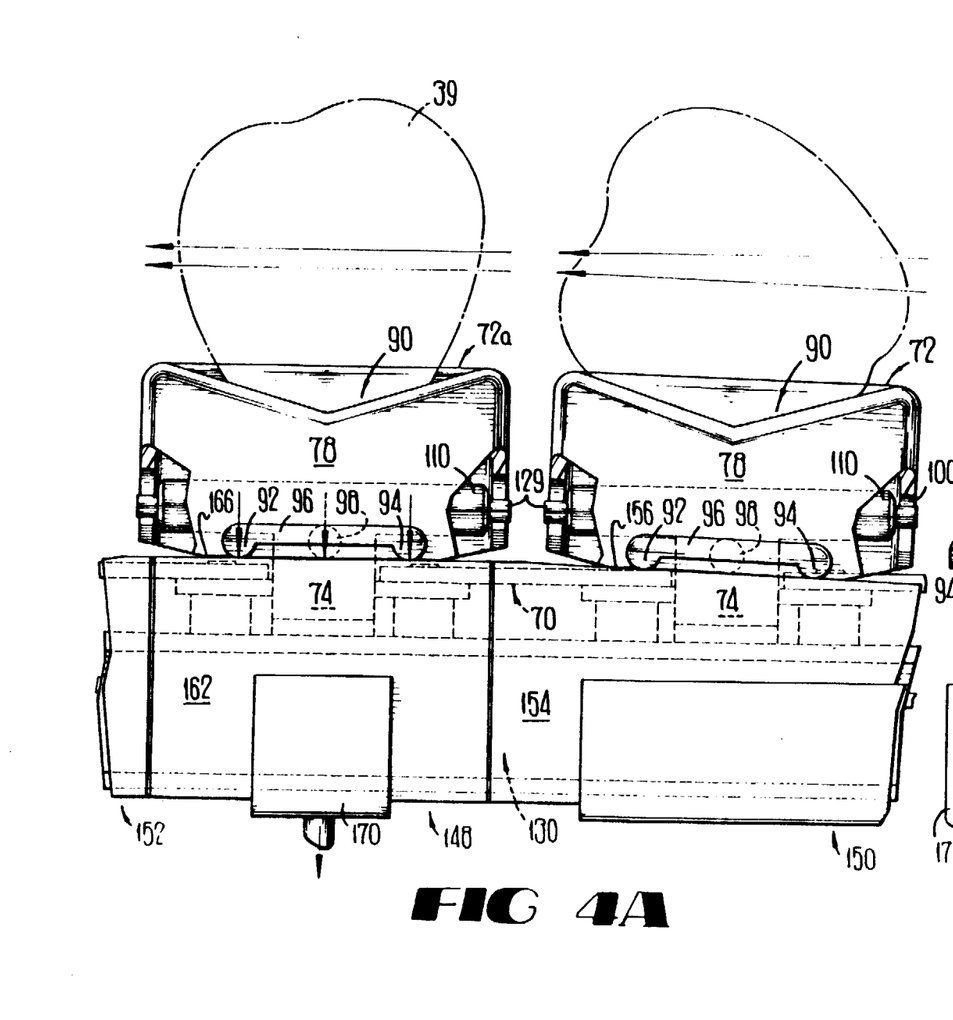
FIG. 4A is an elevation view taken along line 4A—4A of FIG. 3A, partially broken away for illustration, showing the weighing zone of the present invention.
Figure 4B:
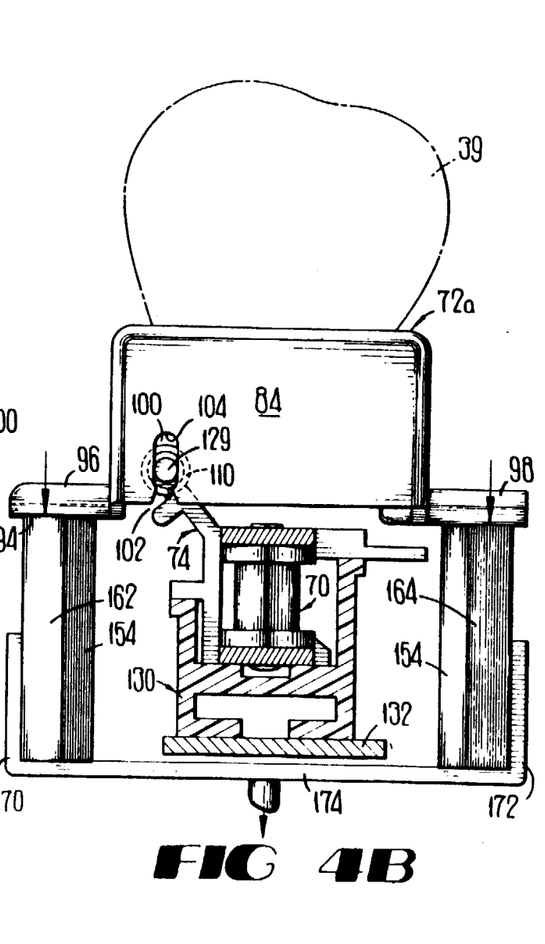
FIG. 4B is a cross-section view taken along line 4B—4B of FIG. 3A.

With reference to FIGS. 2, 3 and 4B, a plurality of cups 72 attach in series to the chain 70 with brackets 74. Each cup 72 includes a skirt defined by two sidewalls 78 and 80, a front wall 82, and a back wall 84. The front wall 82 joins the forward ends of the sidewalls 78 and 80; the back wall 84 joins the back ends of the sidewalls 78 and 80. The walls 78, 80, 82 and 84 thereby form the continuous perimeter skirt.

Connected to the upper edges of the walls 78, 80, 82 and 84 is a transverse panel 86 which, in the illustrated embodiment, includes several facets 88 depending downwardly to form a cavity 90. The cavity 90 receives and retains one of the articles 39, such as an apple, orange, pear, onion, potato or other fruit or vegetable, to be weighed and sorting with other like fruits and vegetables by the weighing and sorting apparatus 15. In an alternate embodiment (not illustrated) the central portion of the panel 86 is provided with one or more holes so that no fluid or small trash such as stems and leaves will accumulate in the cavity 90 and so as to facilitate washing of the machine.

As best shown in FIGS. 3 and 4A, each cup 72 has two spaced-apart pins 92 and 94 attached to and extending from the sidewall 78. The pins 92 and 94 are parallel, and in the illustrated embodiment are joined by a plate 96. Preferably, the pins 92 and 94 are equally spaced longitudinally from a transverse axial line through the middle of the cup 72. A third pin 98 extends laterally from the opposite sidewall 80. The pin 98 is coaxial with the transverse axial line which extends through the middle of the cup. The bottom surfaces of the pins 92, 94 and 98 are preferably rounded.

As best shown in FIGS. 2, 4A and 4B, the front wall 82 and the back wall 84 are each provided with a vertically oriented, elongate, transversely aligned slot 100. The slot 100 has an open end 102 at the lower edge of the walls 82 and 84. The upper end 104 is semi-circular. The slot 100 extends to approximately the vertical midpoint between the lower and upper edges of the walls 82 and 84. The slot 100 preferably is formed closer to the sidewall 78 than to the longitudinal axis of the cup 72, defined by the direction of travel of the conveyor 20, although the slot 100 may be positioned between the sidewall 78 and the longitudinal axis. A bead 106 is extended from each side of the slot 100 adjacent the lower open end 102, for a purpose discussed below.

With continued reference to FIGS. 2 and 4B, each cup 72 is connected to the chain 70 with a bracket 74, as discussed above. The bracket 74 combines a chain clip 108 and a pivot shaft 110. The chain clip 108 includes a lower arm 112, an upper arm 114 parallel to and spaced above the lower arm, and a side connector 116 interconnecting the lower and upper arms. The chain clip 108 defines an open-ended U-shape in cross section, lying on one side. A tooth 118 at the free end of the lower arm 112 is hooked to the lower plate 69 on the chain 70. The upper arm 70 includes a notch which receives the upper plate 67 on the chain 70. A support flange 120 extends laterally from the upper arm 114 under the lower edge of the sidewall 80. A track support arm 122 extends laterally from the side connector 116 medial of the upper and lower arms 114 and 112.

An L-shaped flange 124 is connected at an angle to the corner defined by the connection between the upper arm 114 and the side connector 116. The pivot shaft 100 is connected to the outside upper surface of the flange 124 near the corner defined by a long leg 126 and a short leg 128 comprising the L-shaped flange 124. A pin 129 is formed at each of the longitudinal ends of the pivot shaft 120. The pins 129 are narrower in diameter than the pivot shaft 120 and the pins 129 are received by the slots 100. The width of the slots 100 is slightly larger than the diameter of the pins 129, but the beads 106 keep the pins within the slots. The cup 72 is thus freely pivotable or rotatable about the pivot shaft 110. The cup 72 also will move vertically when the cup 72 is in a horizontal position. The purpose of this is so that the cup 72 may be weighed independently of the bracket 74 which connects the cup 72 to the chain 70.

The chain 70 is carried in an elongate track 130 which is secured to the frame 132 of the weighing and sorting apparatus 15. The track 130 has a base 134, an intermediate cross member 136, and a pair of sidewalls 138 and 140. The upper surface of the intermediate cross member 136 has a trough 141 centered on the longitudinal axis of the track 130. The heads of the pivot rollers 71 travel in the trough 141. The track 130 is suitably fixed to the frame of the apparatus 15, such as with a plurality of bolts 144 shown in FIG. 2.

The chain 70 accordingly is moved by the rotating drive sprocket 22 and is supported in the track 130. The chain 70 is secured in the chain clips 108 which connect the plurality of cups 72 to the chain 70. The chain clips 108 ride in the elongate track 130. The bottom surface of the lower arm 112 slideably contacts the upper surface of the cross member 136 of the track 130. The track support arm 122 extending laterally from the chain clip 108 slideably contacts the upper surface of the track sidewall 138. Similarly, the lower surface of the upper arm 114 slideably contacts the upper edge of the other parallel sidewall 140 which comprises the U-shaped elongate track 130. The link of the chain 70 is held in the chain clip 108 between a notch in the upper arm 114 and the tooth 118 on the lower arm 112. The trough 141 in the cross arm 136 provides a space in which the heads of the chain pivot rollers 71 travel relative to the track 130.

Turning again to FIG. 3, the weighing zone 28 includes a scale 148, an entrance ramp 150 preceding the scale in the movement direction of the conveyor 20, and an exit ramp 152. The entrance ramp 150 is defined by a pair of spaced-apart side rails 154. These side rails 154 are in general parallel alignment and have upper camming surfaces 156 which taper upwardly in the direction of travel for the conveyor 20 as indicated by the arrows. The exit ramp 152 is defined by a pair of spaced-apart side rails 158. These side rails 158 are also in general parallel alignment and have upper camming surfaces 160 which taper downwardly in the direction of travel for the conveyor 20. FIG. 4B shows the side rails 154 spaced apart from the sides of the track 130. The track 130 is supported in the weighing zone 28 by cross bars (not illustrated) positioned transverse to the direction of travel of the conveyor 20. The cross bars are attached to the frame 132 of the weighing and sorting apparatus 15.

Figure 3A:
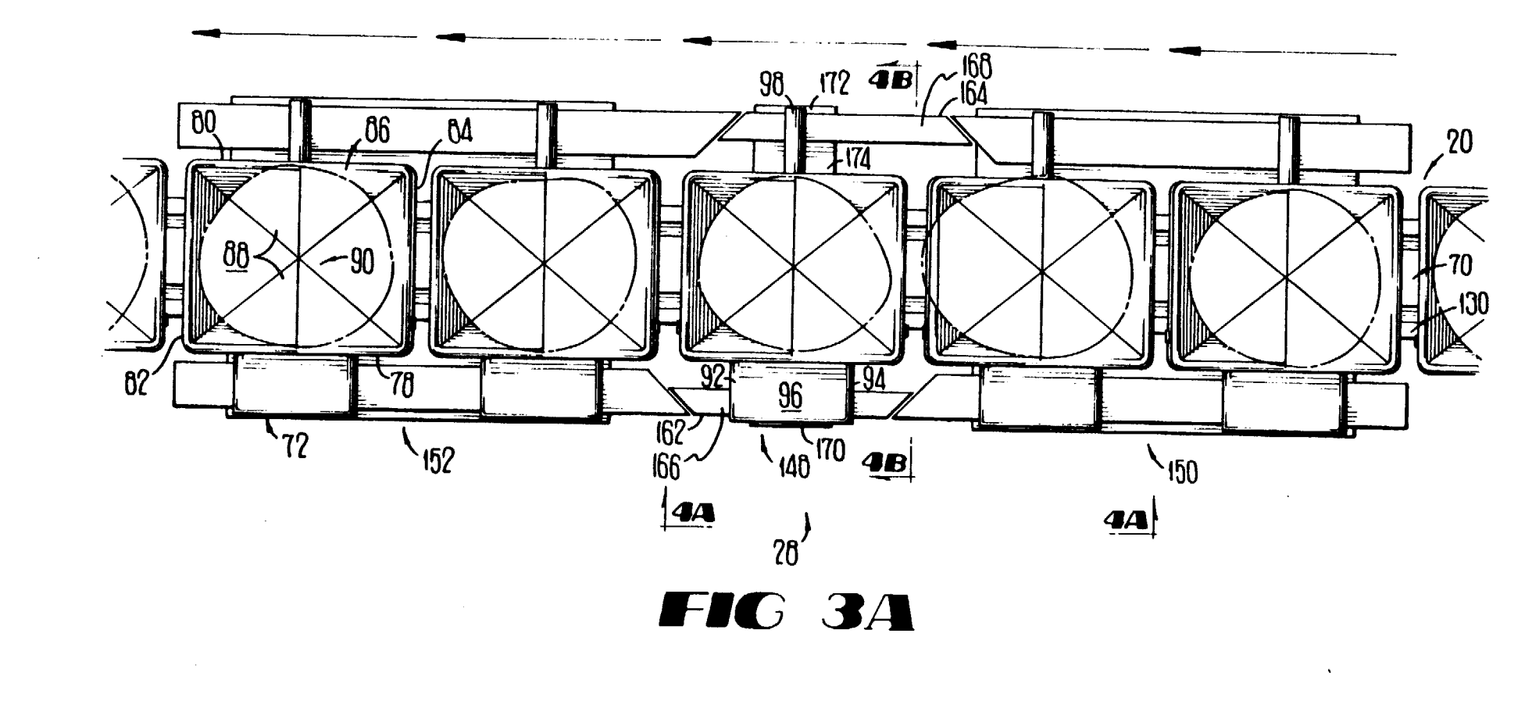
FIG. 3A is a plan view of the weighing zone shown in FIG. 3.

The scales 148 include a pair of spaced-apart side rails 162 and 164. The side rails 162 and 164 are in general parallel alignment and each have upper camming surfaces 166 and 168, respectively. In the illustrated embodiment, the longitudinal ends of the spaced-apart side rails 162 and 164 are transversely off-set. The amount of off-set is equal to the longitudinal distance between the pin 94 and the pin 98 as best illustrated in plan view in FIG. 3A. The off-set relationship of the side rails 162 and 164 permits the side rails 162 and 164 to be of equal length and maximizes the time available for measuring the weight of the cup 72 and its article as the cup 72 moves along the scale 148.

Each side rail 162 and 164 is connected to a vertical flange 170 and 172, respectively, of a U-shaped weighing platform 174. The weighing platform 174 is connected to a load cell (not illustrated) such as that disclosed in U.S. Pat. No. 4,262,807. The load cell provides analog signals which are fed through an amplifier and filter to an analog-digital converter. These analog signals are proportional to the weight detected by the load cell for both the cup 72 and its article. Such signals are converted to digital signals in the digital converter and are fed to a controller. The controller is programmed to associate the detected weight with the particular cup 72a on the scales 148. The nature and operation of such weighing apparatus are known to those skilled in the art and are not further disclosed herein.

Figure 5:
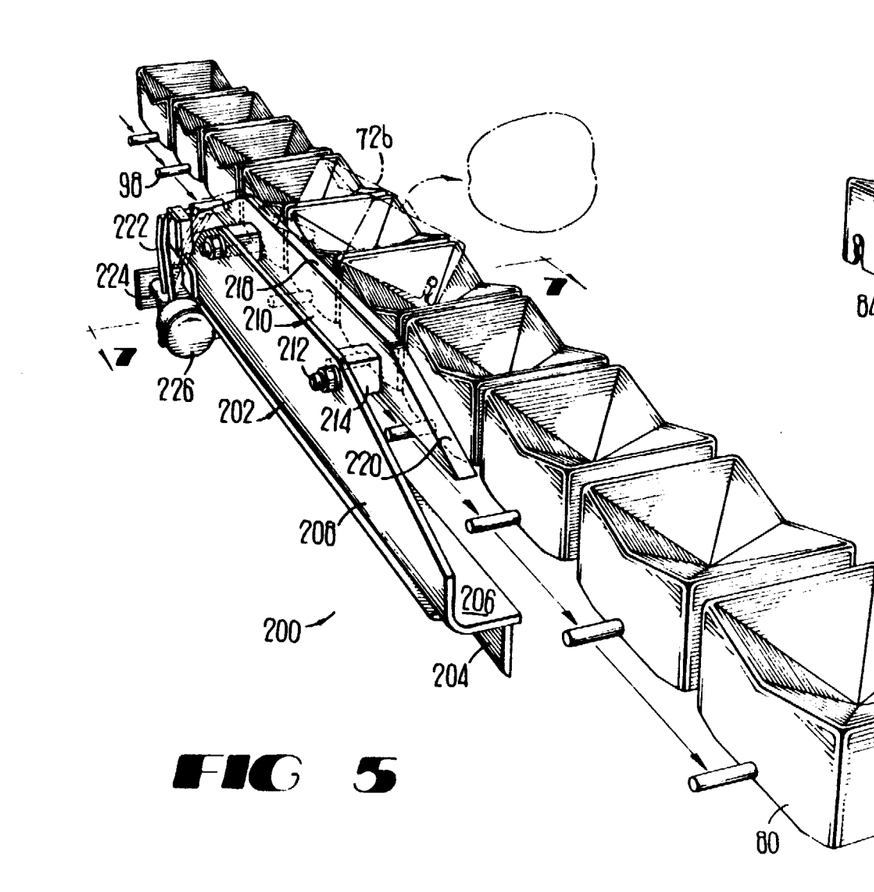
FIG. 5 is a perspective view of the discharge mechanism in a discharge zone of the disclosed embodiment, showing a plurality of cups on the continuous conveyor passing through the discharge zone with one cup in phantom pivoted to discharge an article sideways from the cup.
Figure 6:
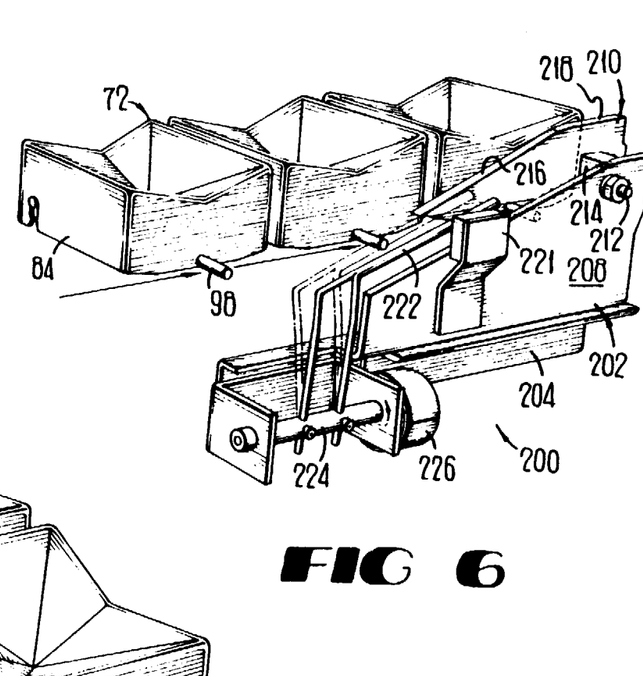
FIG. 6 is a perspective view showing the detail of the discharge mechanism of the disclosed embodiment.
Figure 7:
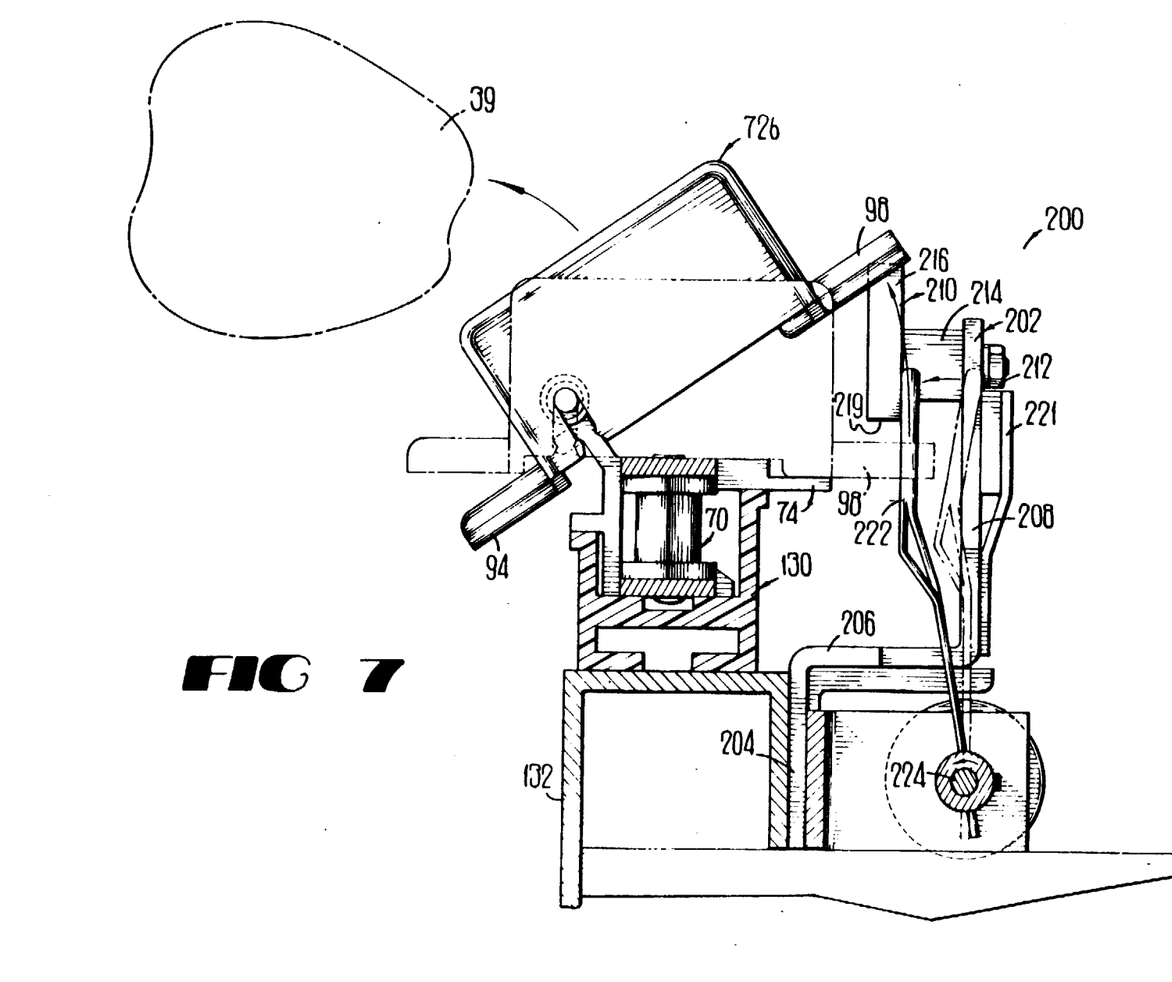
FIG. 7 is a cross sectional view of the discharge mechanism taken along line 7—7 of FIG. 5.

A discharge mechanism 200 for one of the container-fill stations 32 in the discharge zone 30 is illustrated in frontal perspective view in FIG. 5, in a rearward perspective view in FIG. 6, and in cross-sectional view in FIG. 7. A bridge support 202 is attached by a flange 204 welded to the frame 132. A horizontal flange 206 is connected to the flange 204 and extends outwardly from the side of the frame 132. A vertical flange 208 is formed by bending the bridge support 202 along an outer edge of the horizontal flange 206. A bridge 210 is connected to the top edge of the bridge support 202 with a plurality of bolts 212. Each bolt is passed through a spacer 214. The spacer 214 positions the bridge 210 offset from the bridge support 202 over the horizontal flange 206 and adjacent the conveyor 20. The bridge 210 is an elongate member with an upwardly tapered entrance ramp 216, a horizontal camming surface 218 and a downwardly tapered exit ramp 220. A bottom edge 219 of the bridge 210 is vertically higher relative to the horizontal plane in which the pins 92, 94 and 98 of the cups 72 travel on the continuous conveyor. A stop 221 is connected to the upstream end of bridge support 202. The stop 221 extends upwardly above the upper edge of the bridge support 202.

A pivotable bridge strut 222 is provided at the upstream end of the bridge support 202 adjacent the entrance ramp 216. The bridge strut 22 is an angled rod, the lower end of which is attached to a shaft 224 of a rotatable solenoid 226. The upper end of the bridge strut 222 is oriented parallel to the conveyor 20 and angles to taper upwardly adjacent the entrance ramp 216, as best shown in FIGS. 6 and 7. The bend in the bridge strut 222 is positioned vertically lower than the vertical position of the pin 98 extending from the side 80 of each cup 72 carried by the conveyor 20.

When the rotatable solenoid 226 is energized, the shaft of the solenoid 226 is rotated. The bridge strut 222 is pivoted from a first position against the stop 221 to a second position adjacent the entrance ramp 216 of the bridge 210. When the solenoid 226 is deenergized, the solenoid 226 returns the shaft 224 to its original position, thereby rotating the bridge strut 222 away from the bridge 210 back to its first position against the stop 221. The stop 221 is positioned horizontally away from the free end of the pin 98 on each cup 72 on the conveyor 20. Thus, there is a gap between the free end of the pin 98 and the bridge strut 222 when the bridge strut 222 is positioned against the stop 221.

Figure 8:
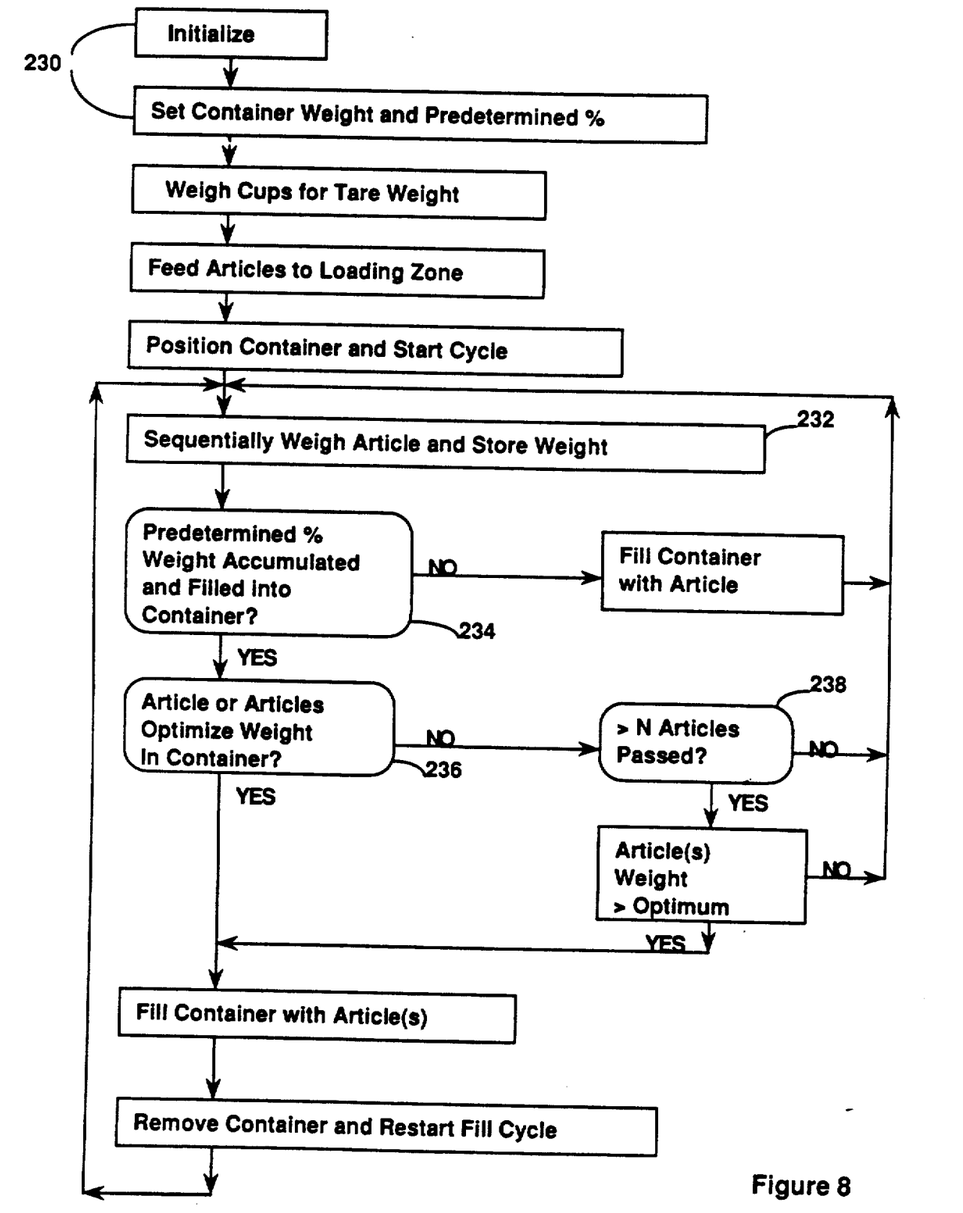
FIG. 8 is a flow chart illustrating the process of weighing and sorting articles in accordance with the disclosed preferred embodiment of the present invention.

The operation of the weighing and sorting machine as described is now discussed. FIG. 8, considered with the following discussion, describes the steps in weighing and sorting articles according to the preferred embodiment disclosed herein. The operational steps depicted in FIG. 8 cover a single one of the several container fill stations 32a . . . 32d in the discharge zone 30, and it should be understood that the same steps apply as well to filling operations at each of the other fill stations. It should also be understood that programming the controller 31 to perform the functions described is well within the ordinary skill in the art. With reference to FIGS. 1 and 8, during operation of the weighing and sorting apparatus 15, the chain 70 of the conveyor 20 moves continuously along the horizontal track 130 around the spaced-apart sprockets 22 and 24. Each of the cups 72 is supported in the horizontal plane by its pivot shaft 110 with the pins 129 positioned at the upper extent of the side slots 100. The support flange 120 extending from the upper arm 114 provides support for the cup 72 on the bottom of the sidewall 78.

As shown at 230 in the block diagram of FIG. 8, the controller is initialized and the container weight and predetermined fill weight percentage for the containers are set. The conveyor 20 is cycled one or more times past the weighing zone 28 to determine the tare weight of each cup 72, and the weight for each cup is stored by the controller.

A supply of articles is placed in the supply bin 38. Typically the articles to be weighed and sorted into containers having a label weight are fruits or vegetables, such as apples, pears, potatoes, onions or the like. These articles have varying weights and typically are sold in bags which are premarked and priced based on a label weight instead of the actual weight of the articles. The conveyors 40 and 42 have upper flights that move in opposite directions in the bin 38, as indicated by the arrows in FIG. 1. The conveyors 40 and 42 thus circulate the articles in the bin 38. Articles on the inside conveyor 42 are moved in a direction from the guide arm 54 toward the end wall 48 and articles on the outside conveyor 40 are moved in a direction from the end wall 48 toward the guide arm 54 and the end wall 46. The guide arm 54 directs articles on the inside conveyor 42 through the opening 50 in the wall 44 into the loading zone 26.

As also shown in FIG. 2, the articles 39 pass through the opening 50 and are received by the L-shaped trough 37 formed by the padded panels 34 and 36. The articles 39 are distributed along the length of the trough 37, and one-by-one, each article moves into an unoccupied cup 72 of the plurality of cups carried by the continuous conveyor 20. The panel 36 oriented at an angle on the opposite side of the continuous conveyor 20 keeps the articles from falling over the cups 72. The cups 72 each have a cavity 90 to hold one of the articles to be weighed and sorted.

Turned again to FIG. 1 and with reference to FIGS. 3, 3A, 4A and 4B, the continuous conveyor 20 carries the cup 72 from the loading zone 26 along the elongate track 130 to the weighing zone 28. At the weighing zone 28, the support for each cup 72 is shifted from the pivot shaft 110, the chain clip 108, and the track 130, to the side pins 92, 94 and 98 of the cup 72. The side pins 92, 94 and 98 travel on the upper camming surfaces of the parallel side rails of the weighing zone 28, as best shown in FIGS. 3 and 4A. The upper camming surfaces 156 of the spaced-apart side rails 154 in the entrance ramp 150 taper upwardly in the direction of travel of the continuous conveyor 20. The beginning of the entrance ramp 150 is vertically lower than the pins 92, 94 and 96 extending from the sidewalls 78 and 80 of the cup 72. As the cup 72 is carried longitudinally along the side rails 154, the upwardly tapered camming surfaces 156 come into contact with the rounded bottom sides of the pins 92, 94 and 98. This causes the cup 72 to move upwardly independently of the chain clip 108. As the cup 72 is elevated, the pins 129 of the pivot shaft 110 guide the vertical movement by traveling in the slots 100.

As shown in FIG. 4A, the cup 72 is carried by the conveyor 10 off the upper end of the entrance ramp 150 onto the side rails 162 and 164 of the scales 148. In this position, the weight of the cup 72 and its contents no longer is supported by the chain clip 108, but instead, the weight is imparted to the surfaces 166 of the side rails 162 and 164 by the pins 92, 94, and 98 which are in an asymmetrical relationship. The pins 92 and 94 slideably contact the camming surface 166 of the side rail 162; the pin 98 slideably contacts the camming surface 168 of the side rail 164. A sensor (not illustrated) detects when the pin 98 passes onto the camming surface 168. One such sensor is a photosensor electrically connected to the controller and carried by a flange in the weighing zone 28. The pin 98 momentarily breaks a beam of light emanating from a light source carried by a second flange. When the beam of light is broken, a first signal is provided the controller to indicate that a cup 72 is fully on the scales. Similarly, a second signal is transmitted to the controller by a second photosensor and light source positioned on flanges adjacent the end of the side rail 164. The second signal is generated when the pin 98 moves off of the camming surface 168 onto the exit ramp 152.

With the cup 72 fully on the scales 148, the weight of the cup and the article is measured by the load cell which provides a signal proportional to the weight detected by the load cell for both the cup 72 and its article. The step is shown at 232 in FIG. 8. The signal corresponding to the weight of each load cup 72 is converted by an analog to digital converter (not shown) and is fed to the controller as the cup is drawn over the side rails 162 and 164 of the scales. The controller is directed by the enabling signal from the sensor to begin averaging the instantaneous weight signal over the time that the loaded cup is on the scales. The article weight is determined by subtracting the previously-measured tare weight for the cup from the gross weight of the cup and its contents. The net weight of the article in each cup is stored by the controller.

The conveyor 20 continues moving and the cup 72 is moved in sequence from the scales 148 to the exit ramp 152. The pins, 92, 94 and 98 of the cup 72 are transferred onto the upper camming surfaces 160 of the side rails 158. The side rails 158 taper downwardly in the direction of travel of the continuous conveyor 20. In doing so, the support for the cup 72 is switched from the pins 92, 94 and 96 back to the pivot shalt 110, the chain clip 108, and the track 130. The cup 72 is thereby lowered with respect to the pivot shaft 110. As the cup 72 moves downwardly, the pins 129 are guided in the slots 100 to be in contact with the upper extent of the slots 100. While the cup 72 is moving on the exit ramp 152, the next cup in sequence is moving on the scales 148 and its weight is being computed, as described above.

The weighed cups 72 are carried by the continuous conveyor 20 through the discharge zone 30. The weighing and sorting apparatus 15 illustrated in FIG. 1 includes the four separate discharge stations, 32a, 32b, 32c and 32d in the discharge zone 30. Each station 32 includes equipment discussed above to hold, fill and transfer a container of articles. However, the discharge mechanism 200 shown in FIGS. 5, 6, and 7 is provided for each discharge station and is activated selectively by the controller to cause a selected cup, such as cup 72b shown in phantom in FIG. 5 and in solid line in FIG. 7, to pivot and discharge its article from the cavity 90 into the container to be filled. An empty cup 72 and a cup having an article not selected for discharge at the particular station 32 by-passes the discharge station 32 because the pin 98 extending from the cup 72 passes under the bottom edge 219 of the bridge 210.

The pivotal bridge strut 222 is at a first position against the stop 221 when the solenoid 226 is not energized, as shown in phantom in FIG. 7. When an article is selected for discharge at the station, the rotatable solenoid 226 is energized. This rotates the shaft of the solenoid 226, pivoting the pivot block 224 from its first position against the stop to its second position adjacent the entrance ramp 216 of the bridge 210. The pin 98, moving in a horizontal plane on the continuous conveyor, intersects the upwardly-tapered bridge strut 222. The pin 98 of the selected cup 72b moves upwardly along the tapering edge of the strut 222 and onto the entrance ramp 216, and the cup 72b begins to pivot upwardly around the pivot shaft 110. As the cup reaches the horizontal camming surface 218, the cup 72b reaches its maximum angle of pivot and the article contained in the cavity 90 is tipped from the cup onto a slide which directs the article into the container-filling apparatus discussed above. The conveyor 20 continues moving and the pivoted cup travels along the downwardly tapered exit ramp 220. This causes the cup to pivot around the pivot shaft 110 from the second pivoted position back to the first horizontal position.

The rotatable solenoid 226 is deenergized when the pin 98 contacts and begins moving up the entrance ramp 216. This causes the shaft of the solenoid 226 to rotate to its first position, returning the bridge strut 222 to its first position against the stop 221. Thereby, only the selected cup 72b travels onto the bridge 210. The solenoid 226 of each discharge mechanism is connected to the controller. A pulse proportional to the speed of travel of the chain 70 is fed from an optical encoder sensor 33 to the controller 31 so that the controller can determine when a cup has traveled the known distance between the weighing zone and a selected discharge zone where the solenoid 226 is actuated. The selective actuation of one of the solenoids is dictated by the weight detected for the particular article which is weighed in the weighing zone 28 and by the fill history of the container at the discharge zone.

The controller 31 monitors the weight of the articles discharged into the container. This function is indicated at 234 in FIG. 8, wherein the controller determines whether the predetermined percentage weight of accumulated articles have been filled into the container in the discharge zone, for example, 32a. If not, the next available article in sequence is discharged into the container. A group of articles in consecutive cups 72 on the conveyor is discharged by the controller into a container which has not reached its predetermined weight of articles already discharged.

After the accumulated weight of the articles in the container reaches a predetermined value, typically chosen as a certain percentage of the full or label weight of the container, the controller (as indicated at 236 in FIG. 8) scans the next series of articles coming from the weighing zone 28 to select at least one article of optimum weight to discharge into the container, such that the combined weight of the group of articles is no less than the predetermined full or label weight and thereby minimizes the weight overage. In a preferred embodiment, the controller scans the weighed articles to locate two articles having a combined weight sufficient to bring the total weight in the container to the label weight. As the controller is scanning for articles having a specific weight, the solenoid remains deenergized and each non-selected article remains on the conveyor 20 in its respective cup 72. When the weight of the next available articles (or articles) is optimum to fill the container to its label weight, the next article (or articles) is discharged into the container, the container is closed and removed, and a new container is positioned in the discharge zone. Otherwise, that article by-passes the discharge station 32a. The occupied and unoccupied cups 72 thus move past that particular discharge zone and the occupied cups are available for selection in a subsequent discharge zone. An unselected article may recirculate through the loading zone where the unoccupied cups receive another article as discussed above.

In the flow chart shown in FIG. 8, when an article having optimum weight to complete the label weight of the container is not located within a predetermined number of opportunities, the controller selects and discharges the next available articles having a combined weight in excess of the optimum weight to fill the container to its label weight. This step, 238 in FIG. 8, prevents an undue delay in filling containers, and prevents the apparatus from entering an unending loop where all available articles exceed optimum weight.

Accordingly, the present invention reduces handling of articles during the weighing and sorting processing which groups a plurality of such articles in a container such that the combined weight of the groups is not less than a predetermined value and minimize the weight overage. Because an article once selected remains on the conveyor, the article is not subjected to additional handling by return to the supply bin and subsequent reloading onto the conveyor at the supply bin, as in the prior art. Damage to the article caused by mechanical processing and by the jostling against other articles is reduced.

The principles, preferred embodiments and modes of operation of the present invention have been described in the foregoing specification. The invention is not to be construed as limited to the particular forms disclosed because these are regarded as illustrative, rather than restrictive. Moreover, variations and changes may be made by those skilled in the art without departing from the spirit of the invention as described by the following claims.

What is claimed is:

1. An apparatus for filling a container to a predetermined weight with a plurality of articles having varied weights, comprising:
   a continuous conveyor driven in a horizontal plane through a loading zone, a weighing zone, and at least one discharge zone;
   a plurality of cups attached to said continuous conveyor, each cup passing through said loading zone so that each empty cup receives an article from a group of said articles;
   a scale in said weighing zone to determine the weight of said articles in each said cup;
   a discharge mechanism in said discharge zone selectively activated at least one of said plurality of cups so that said article moves from said cup into said container; and
   a controller to accumulate the sum of the weights of said articles discharged into said container until said sum exceeds a predetermined fraction of said predetermined weight and then to select at least one of said articles in said plurality of cups to discharge into said container, said selected article having a weight sufficient to increase the accumulated weight in said container to no less than said predetermined weight, each said article remaining in its respective cup and passing repeatedly through said weighing zone and said discharge zone until said article is discharged into a container.

2. The apparatus for filling a container as recited in claim 1, wherein each cup has a pivot shaft on one sided so that said cup is pivotable from a first horizontal position to a second raised position at an angle transverse to a direction of travel of said continuous conveyor.

3. The apparatus for filling a container as recited in claim 1, wherein each said cup includes three asymmetrically oriented pins extending laterally from said cup.

4. The apparatus for filling a container as recited in claim 3, wherein two of said three pins extend laterally from a first side of said cup.

5. The apparatus for filling a container as recited in claim 4, wherein the other one of said three pins extends laterally from a second opposite side of said cup.

6. The apparatus for filling a container as recited in claim 3, wherein one of said three pins is aligned with an axis of said cup and the other two of said three pins are parallel to and spaced apart from said axis.

7. The apparatus for filling a container as recited in claim 6, wherein said two of said three pins are equidistant from said axis.

8. The apparatus for filling a container as recited in claim 1, wherein said scale comprises a pair of side rails on which said cup is supported in sequence independently of said conveyor.

9. The apparatus for filling a container as recited in claim 8, wherein said side rails are longitudinally offset.

10. An apparatus for filling a container to a predetermined weight with a plurality of articles having varied weights, comprising:

means for loading an article into one of a plurality of cups attached to a continuous conveyor;

means for weighing the article in each cup;

means for discharging a selected article into said container;

means for accumulating a sum of the weight of the articles discharged into said container until said sum is a predetermined fraction of said predetermined weight; and means for selecting at least one article to discharge into said container, said selected article having a weight sufficient to raise the weight in said container to no less than said predetermined weight, said article remaining in said cup and traveling on said conveyor until such article is selected and discharged into a container.

11. A method for filling a container to a predetermined weight with a plurality of articles having varied weights, comprising:

loading an article into one of a plurality of cups attached to a continuous conveyor;

weighing the article in each cup;

discharging a plurality of articles into said container until the sum of the weight of the articles discharged into said container is a predetermined fraction of said predetermined weight; and selecting at least one article in one of said cups to discharge into said container, said article having a weight sufficient to raise the weight in said container to no less than said predetermined weight, said article remaining in said cup and being repeatedly weighed as the continuous conveyor cycles until said article is selected and discharged into a container.

12. The method as recited in claim 4, wherein said article is discharged by pivoting said one cup upwardly to tip said article from said cup.

* * * * *

UNITED STATES PATENT AND TRADEMARK OFFICE
CERTIFICATE OF CORRECTION

PATENT NO. : 5,024,047

DATED : June 18, 1991

INVENTOR(S) : WILLIAM H. LEVERETT

It is certified that error appears in the above-identified patent and that said Letters Patent is hereby corrected as shown below:

In Column 13, line 9, "sided" should read --side--.

In Column 14, line 35, "claim 4" should read --Claim 11--.

Signed and Sealed this

Twenty-third Day of November, 1993

Attest:

BRUCE LEHMAN

*Attesting Officer*  *Commissioner of Patents and Trademarks*